(12) United States Patent  
Baldwin et al.

(10) Patent No.: US 8,970,867 B2
(45) Date of Patent: Mar. 3, 2015

(54) SECURE MANAGEMENT OF 3D PRINT MEDIA

(71) Applicant: Mercury 3D, LLC, Los Angeles, CA (US)

(72) Inventors: Christopher Buzz Baldwin, Attleboro, MA (US); Timothy Alan Padilla, Moorpark, CA (US); Jeffrey William Stevens, Los Angeles, CA (US)

(73) Assignee: Mercury 3D, LLC, Los Angeles, CA (US)

( * ) Notice: Subject to any disclaimer, the term of this patent is extended or adjusted under 35 U.S.C. 154(b) by 36 days.

(21) Appl. No.: 13/783,747

(22) Filed: Mar. 4, 2013

(65) Prior Publication Data

US 2013/0235412 A1 Sep. 12, 2013

Related U.S. Application Data

(60) Provisional application No. 61/607,441, filed on Mar. 6, 2012.

(51) Int. Cl.
*G06F 3/12* (2006.01)
*G06F 21/60* (2013.01)
*G06F 21/62* (2013.01)

(52) U.S. Cl.
CPC ............ *G06F 3/1222* (2013.01); *G06F 3/1238* (2013.01); *G06F 3/1285* (2013.01); *G06F 21/608* (2013.01); *G06F 21/6209* (2013.01); *G06F 2221/2143* (2013.01)

USPC ............................ 358/1.14; 358/1.1; 358/1.15

(58) Field of Classification Search
USPC ................... 358/1.1, 1.9, 1.14, 1.15; 380/243; 345/419
See application file for complete search history.

(56) References Cited

U.S. PATENT DOCUMENTS

| 7,277,958 | B2* | 10/2007 | Chung et al. ................... 709/231 |
| 7,657,033 | B2* | 2/2010 | Fiske ............................ 380/259 |
| 7,872,772 | B2 | 1/2011 | Caffary, Jr. |
| 8,392,603 | B2* | 3/2013 | Kleks et al. ................... 709/236 |
| 2006/0191426 | A1 | 8/2006 | Timmerman et al. |
| 2009/0164379 | A1 | 6/2009 | Jung et al. |
| 2010/0042846 | A1 | 2/2010 | Trotter et al. |
| 2011/0035287 | A1 | 2/2011 | Fox |

FOREIGN PATENT DOCUMENTS

WO 00/42574 7/2000

* cited by examiner

*Primary Examiner* — Thomas D Lee
(74) *Attorney, Agent, or Firm* — Fish & Tsang LLP

(57) ABSTRACT

A system for printing 3D objects protects a 3D object file from being copied by separating the file into a series of instructions for printing the 3D object and sends those instructions piecemeal to a printing facility. The system enforces a methodology that forces the print facility to delete a previous set of instructions before the print facility can receive the next set of instructions to print a 3D object. By using such a system, the print facility never has the entire 3D print file in memory, preserving the rights of the creator of the 3D print file.

17 Claims, 4 Drawing Sheets

SECURE MANAGEMENT OF 3D PRINT MEDIA

This application claims priority to U.S. Provisional Application No. 61/607,411, filed Mar. 6, 2012, which is hereby incorporated by reference in its entirety.

FIELD OF THE INVENTION

The field of the invention is printing techniques for three dimensional media

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Three dimensional ("3D") printing allows for the creation of 3D objects from electronic media files. 3D printing can be more efficient than traditional manufacturing methods and is used in various fields including, for example, architecture, industrial design, jewelry, engineering, aerospace, and medicine. However, since the value of a printed 3D object is oftentimes much greater than that of a printed 2D object, digital rights management (DRM) of the print files to control who can print a 3D object and how many times that entity can print that 3D object becomes that much more important when selling files for high-quality print jobs. A consumer who rightfully purchases the rights to print a 3D object may share the file with non-customers who are unauthorized to print the 3D object, who are then able to create exact counterfeit copies of an unlawfully gained product. Additionally, the need to protect the electronic media file from being copied and altered for unauthorized use is a concern.

U.S. Pat. No. 7,872,772 to Caffary and WO00042574 to Gaylo both teach methods of streaming three dimensional print jobs directly to a three-dimensional printer. Both Gaylo and Caffary, however, fail to provide any sort of security to prevent a user from sharing the print file with third parties who do not have the right to print the 3D object. Caffary also fails to provide any security rights to prevent a user from printing many copies of the same 3D object over and over again, when the user only purchased the right to print an object a limited number of times. Without this security, sellers may be hesitant to send 3D print files to paying customers, thereby significantly limiting the usefulness of 3D printing technologies.

US20090164379 to Jung teaches a system and method of securing a data file through a DRM module that disables an operational component of a three dimensional print file unless a customer can provide proof of purchase. However, because hacking technologies frequently keep pace with security technologies, Jung's files could be unlocked through hacking techniques or a user could provide both the file and the user's unlock code to third parties to circumvent Jung's security procedures.

Thus, there is still a need for improved methods of 3D printing that allows print files to be sent in a more secure way.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems and methods in which the instructions to print a 3D object are split into more than one subsets of instructions before serially being sent to a print facility. Generally, when the subsets of instructions are received by the print facility, the system is configured such that the first subset of instructions are sent to the printer to print the 3D object, then the first subset of instructions is deleted before the second subset of instructions is then received by the print facility. Preferably, the first set of instructions is completely deleted before the second data stream is even received, ensuring that the print facility never has more than a single subset of instructions in memory at a time. In another preferred embodiment, all instructions are preferably deleted from the print facility after the 3D object is printed. In fact, one of the instructions of the last received printed subsets could be a separate routine that ensures that all of the print instructions have been deleted by the print facility.

Using such a system, a receiver of print instructions could print a 3D object yet never be in possession of the entire print file. Such streams could be sent from the seller and routed to the print facility through the buyer's computer, but are preferably sent directly to the printer of the print facility in order to prevent the buyer's computer from capturing any of the instructions within the data stream or from reassembling the file from each of the captured subsets. In some embodiments, the system is configured to ensure a tunnel directly from the seller to the 3D printer itself is established before the print job is sent to ensure that packets are not being "sniffed" or intercepted by a buyer's computer system couple to the 3D printer. As used herein, a "3D printer" is any mechanical device that receives a set of instructions to produce a three-dimensional object. Such 3D printers could, for example, use molten polymer deposition, granular material binding, photopolymerization, or other known techniques. As used herein, a "print facility" is any computer system having a 3D printer that is configured to receive subsets of print instructions and print an entire 3D object by executing subsets of instructions serially one after another.

In some embodiments, only part of the first subset of instructions for printing the 3D object are deleted before the second subset of instructions is sent to the print facility. Such an embodiment would be important for 3D printers that are unable to pause in the middle of printing a 3D object. Generally, the system determines that a certain threshold amount of the first subset of instructions be deleted from the print facility before sending the second subset of instructions to the print facility. The system could determine that at least 50%, 60%, 70%, 80%, or 90% of the first subset of instructions be deleted before sending the second subset of instructions, or could determine that a minimum number of megabytes of the first subset of instructions be deleted, such as at least 1 MB or at least 5 MB of the file. In either case, it's preferred that the second subset of instructions are only sent by the source of the instructions after an alert has been received by the sender, informing the sender that a minimum threshold of the first subset of instructions has been deleted before the sender sends the next set of instructions. The system is preferably configured such that this method continues with the third subset of instructions, requiring an alert that a minimum amount of the second subset of instructions has been deleted, and so on and so forth until all of the instructions have been sent by the 3D print facility and the 3D object has been fully printed.

In another embodiment of the invention, the subsets of instructions are encrypted prior before they are received by the print facility, and are only decrypted by an authorized computer system within the print facility, preferably with some sort of public/private key system. In some embodiments, that authorized computer system physically resides within the 3D printer itself to minimize tampering, although the authorized computer system could be a print server coupled to the printer, or a small computer system box attached to the 3D printer. In some embodiments, the decrypting computer system is sold as part of a kit for the 3D printer that includes a memory having encrypted 3D print files, allowing users to print those encrypted 3D print files only by attaching the decrypting computer system to their 3D printer. The system could also be configured to only hold a single subset of unencrypted instructions within its memory. Using such a configuration, the system would first receive a first subset of instructions, decrypt that first subset of instructions to print a first part of the 3D object using the unencrypted instructions, and then would need to then delete the unencrypted first subset of instructions before decrypting a second subset of instructions. This would allow the system to receive a plurality of encrypted subsets of instructions, but still maintain security by ensuring that only one set of unencrypted subsets of instructions are in memory at a time.

Each subset of instructions could be received whole or piecemeal in several divided packets. In an embodiment where the subsets of instructions are encrypted, each packet received by the print facility could be decrypted as the packets are received, or could be aggregated into the first subset of encrypted instructions before decryption takes place. In another embodiment, the system could treat each packet as a subset itself, and could enforce a schema that decrypts the instructions contained in the first packet, print the instructions contained in that unencrypted packet, deletes the unencrypted instructions in that first packet, and ensure deletion before unencrypting the instructions in a second packet of the first subset of instructions.

In another embodiment, the system has a secure print file player application that manages and handles printing the 3D object and deleting each subset of instructions accordingly. In some embodiments, the secure print file player application is installed on the client computer system, on a separate computer system box between the client's computer system and the 3D printer, on a print server, or within a computer system installed physically inside the 3D printer itself.

Various objects, features, aspects and advantages of the inventive subject matter will become more apparent from the following detailed description of preferred embodiments, along with the accompanying drawing figures in which like numerals represent like components.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including ensuring that an entire set of instructions for printing the 3D object never resides within the print facility at any time.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

DETAILED DESCRIPTION

Figure 1:
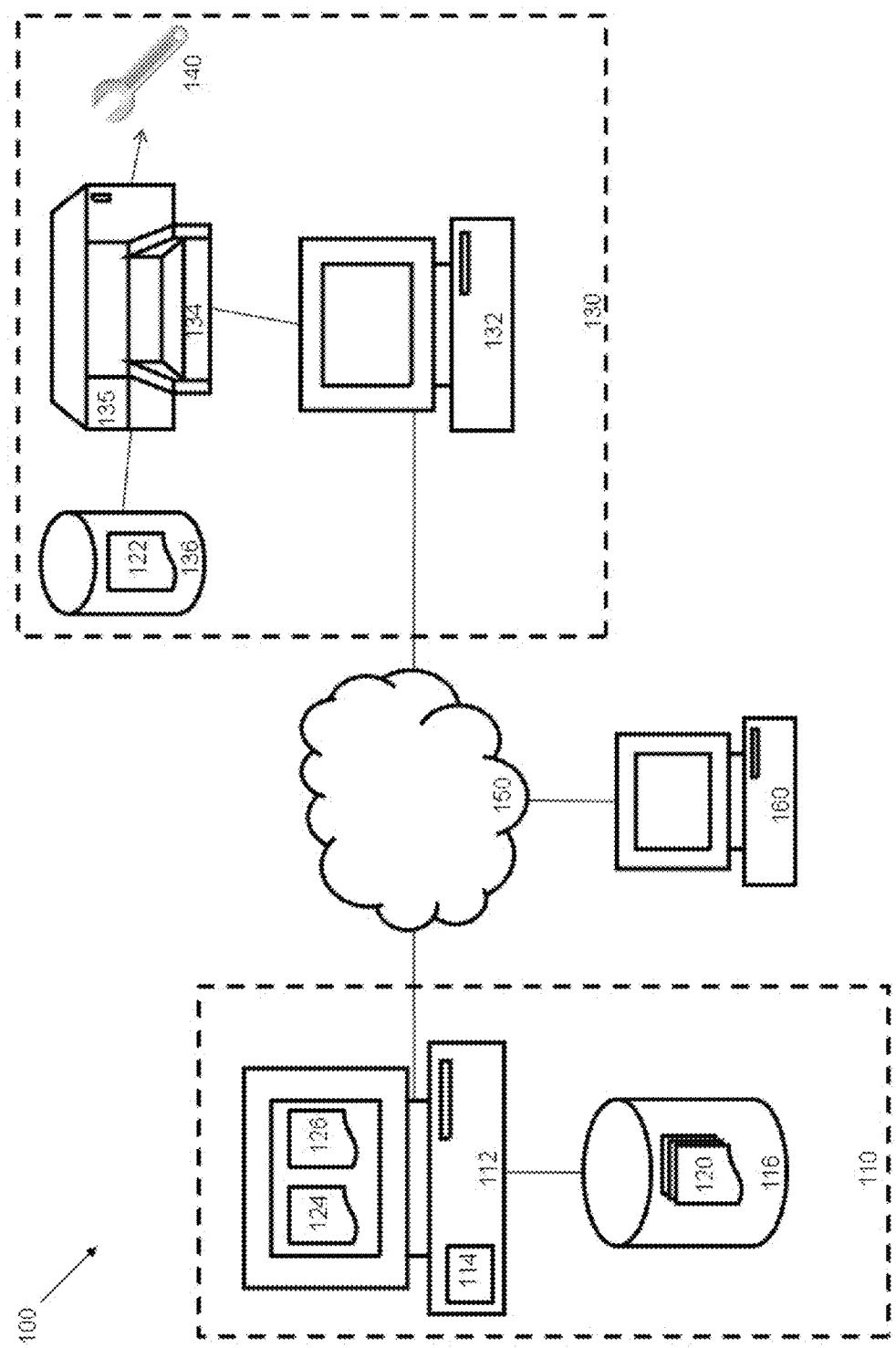
FIG. 1 is a schematic of a system embodying the current invention

FIG. 1 shows a system 100 having (a) an instruction source 110 having a computer system 112 and a memory 116 holding 3D print instructions 120, (b) a print facility 130 having a computer system 132 with a printer 134 having a memory 136, (c) a computer network 150 that functionally couples instruction source 110 and print facility 130, and (d) a DRM server 160 that monitors and enforces rules for sending print instructions 120 from instruction source 110 to print facility 130.

Instruction source 110 is shown euphemistically here as a computer system 112 and a non-transient memory database 116 having a set of instructions 120 for creating a 3D object, however instruction source 110 could be any suitable electronic medium that acts as a source for 3D object print instructions, such as a network attached storage, a database of instruction sets, and a website selling 3D printed object instructions. Print instructions 120 is generally a computer file on a file system comprising a set of instructions that a 3D printer follows in order to print a 3D object.

Computer system 112 acts as an enforcer of secure 3D printing methodology by splitting up instructions 120 into separate subsets of instructions, shown here as subset 122 (saved in printer memory 136), subset 124, and subset 126 (saved in computer system 112's memory). In a preferred embodiment, an agent 114 is installed on computer system 112 which communicates with DRM server 160 to ensure that instructions 120 are parsed into subsets appropriately, and are sent to printer facilities appropriately. In some embodiments, agent 114 also encrypts and/or packetizes each subset before it is sent to printer facility 130 through network 150. As used herein, a "computer system" is a set of one or more computers having a processor, non-transient memory, and a set of instructions that allow it to perform one or more tasks, such as communicating with a user via a functionally coupled user interface and sending instructions to a functionally coupled electronic device. Contemplated computer systems include server rooms, desktop computers, tablet computers, and handheld portable computers (including cell phones, mp3 players, and PDAs).

Network 150 is shown here euphemistically as a computer network cloud that functionally couples instruction source 110 to print facility 130. Network 150 generally comprises a plurality of wired and/or wireless connections through which electronic data could be transmitted from one computer system to another, preferably through a secured tunnel established by instruction source 110, print facility 130, and/or DRM server 160. Computer systems 112, 132, and 160 could be physically coupled to network 150 using wired connections (such as Ethernet cables, fiber optic cables, or telephone cables), or wirelessly coupled to network 150 using wireless connections (such as radiofrequency signals or infrared signals), but in either case are functionally coupled to network 150 to allow communication traffic between the computer systems, should programs on the computer systems be configured to do so.

Print facility 130 is shown euphemistically as a computer system 132 coupled to a 3D printer 134 having memory 136, in the midst of printing a 3D object 140. However, print facility 30 could be any suitable electronic medium that could print a 3D object, such as a 3D printer by itself, a business that prints 3D objects housing a plurality of computer systems and a plurality of 3D printers, and a print server dongle coupled to a 3D printer. In the present embodiment, computer system 132 of print facility 130 receives a first subset of instructions 122 and sends that first subset of instructions 122 to 3D printer 134 to print a first part of 3D object 140 in accordance with the first subset of instructions 122. 3D printer 134 or computer system 132 preferably has an agent 135 that enforces the secure 3D printing methodology by ensuring that the first subset of instructions 122 are completely deleted from the memory 136 of 3D printer 134 before a second set of instructions are sent from instruction source 110. In some embodiments, agent 135 decrypts an encrypted first set of instructions (not shown) to produce the decrypted subset of instructions 122 saved on printer's memory 136.

In embodiments where agent 135 acts to decrypt an encrypted set of instructions, agent 135 preferably resides upon printer 134 to ensure that computer system 132 does not have access to an unencrypted set of instructions. In some embodiments, agent 135 could reside in a dongle (not shown) coupled to the 3D printer, or within a print server (not shown) functionally coupled to the 3D printer, which also would serve to prevent computer system 132 from having access to an unencrypted set of instructions to print the 3D object 140. Once agent 135 has unencrypted the first subset of instructions 122, agent 135 could then queue up the instructions within the 3D printer in bulk or one at a time. In other embodiments, agent 135 communicates with DRM server 160 via a tunnel so that DRM server 160 could act as a security agent that reliably tracks the movement of instructions sets from an instruction source to a print facility, and ensures that the print facility deletes a first set of instructions from its resident memory before a second set of instructions is sent from instruction source 110.

Figure 2:
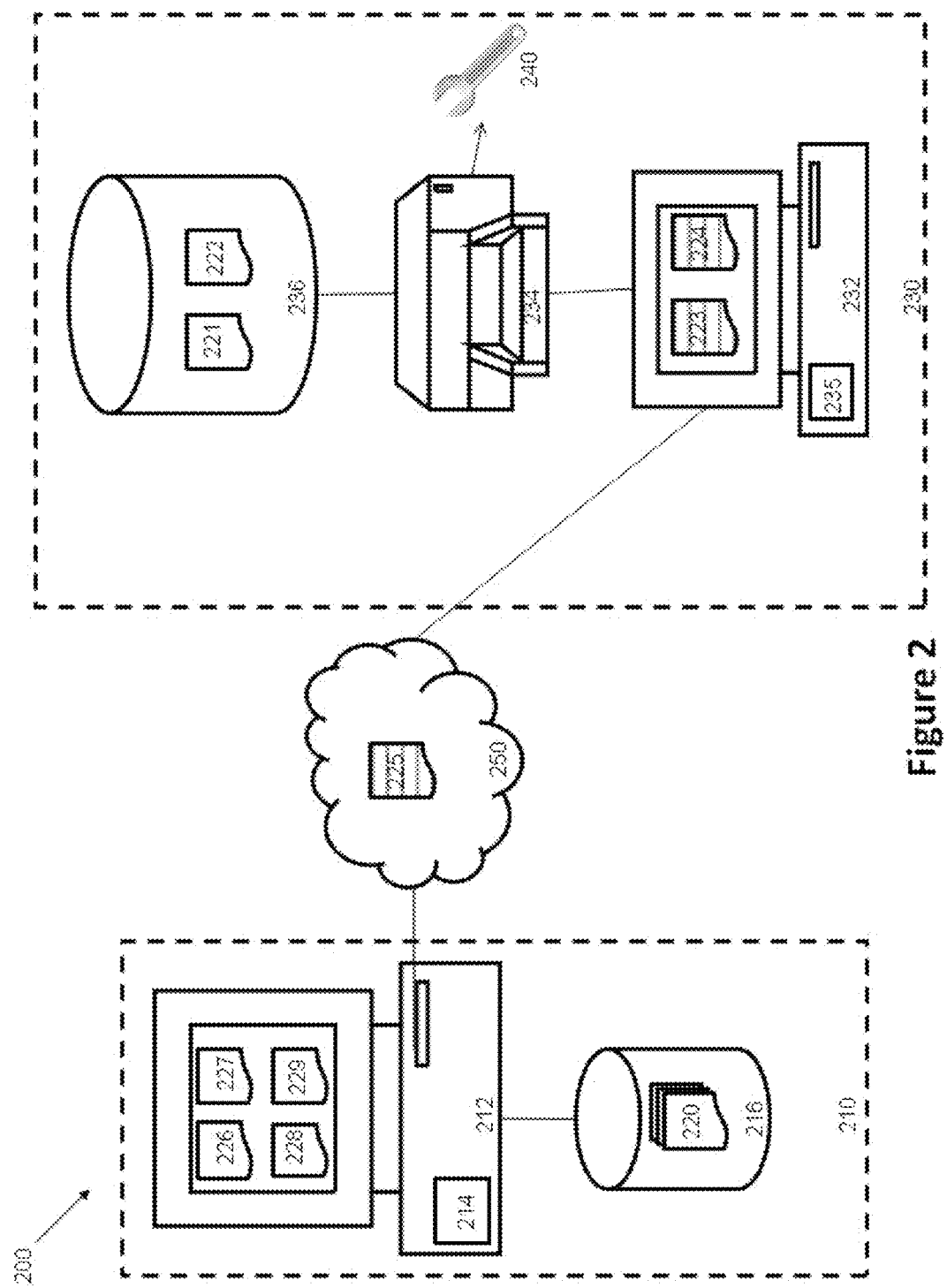
FIG. 2 is a schematic of a system having a second embodiment of the current invention.

FIG. 2 shows a second embodiment of the invention 200, having an instruction source 210 having a computer system 212 and memory 216 and a print facility 230 having a computer system 232, 3D printer 234, and memory 236 connected by a network 250. Here, agent 214 installed on computer system 212 communicates with agent 235 installed on computer system 232 to ensure a secure 3D print file methodology. Agent 214 splits 3D print instructions 220 into nine different sets of instructions 221, 222, 223, 224, 225, 226, 227, 228, and 229. Here, agent 235 ensures that there are at least two unencrypted sets of instructions to ensure that 3D printer 234 never pauses in its print job while waiting for the next set of instructions to be sent by instruction source 210. Unencrypted instructions 221 and 222 have been decrypted by agent 325, and reside upon printer memory 236 to allow 3D printer 233 to print 3D object. Once 3D printer 234 is finished following unencrypted instructions 221, 3D printer 234 then commences to follow unencrypted instructions 222. Agent 235 then decrypts encrypted instructions 223 and streams the decrypted instructions to printer memory 236, ensuring that no decrypted instructions are saved onto any non-transient memory located within computer system 232. Agent 235 only then decrypts encrypted instructions 224 once it has confirmed that unencrypted instructions 222 have been deleted from memory 236.

Agent 235 could be configured to send an alert to agent 214, informing agent 214 that unencrypted instructions 221 have been deleted from memory 236, which then triggers agent 214 to send encrypted instructions 225 to computer system 232. Meanwhile, computer system 212 in instruction source 210 has instruction sets 226, 227, 228, and 229 ready to encrypt and send to print facility 230 once agent 214 receives another alert that another set of instructions (both the unencrypted set temporarily stored in memory 236 and the encrypted set temporarily stored in computer system 232's memory) has been deleted from all of the computer systems at print facility 230.

Figure 3:
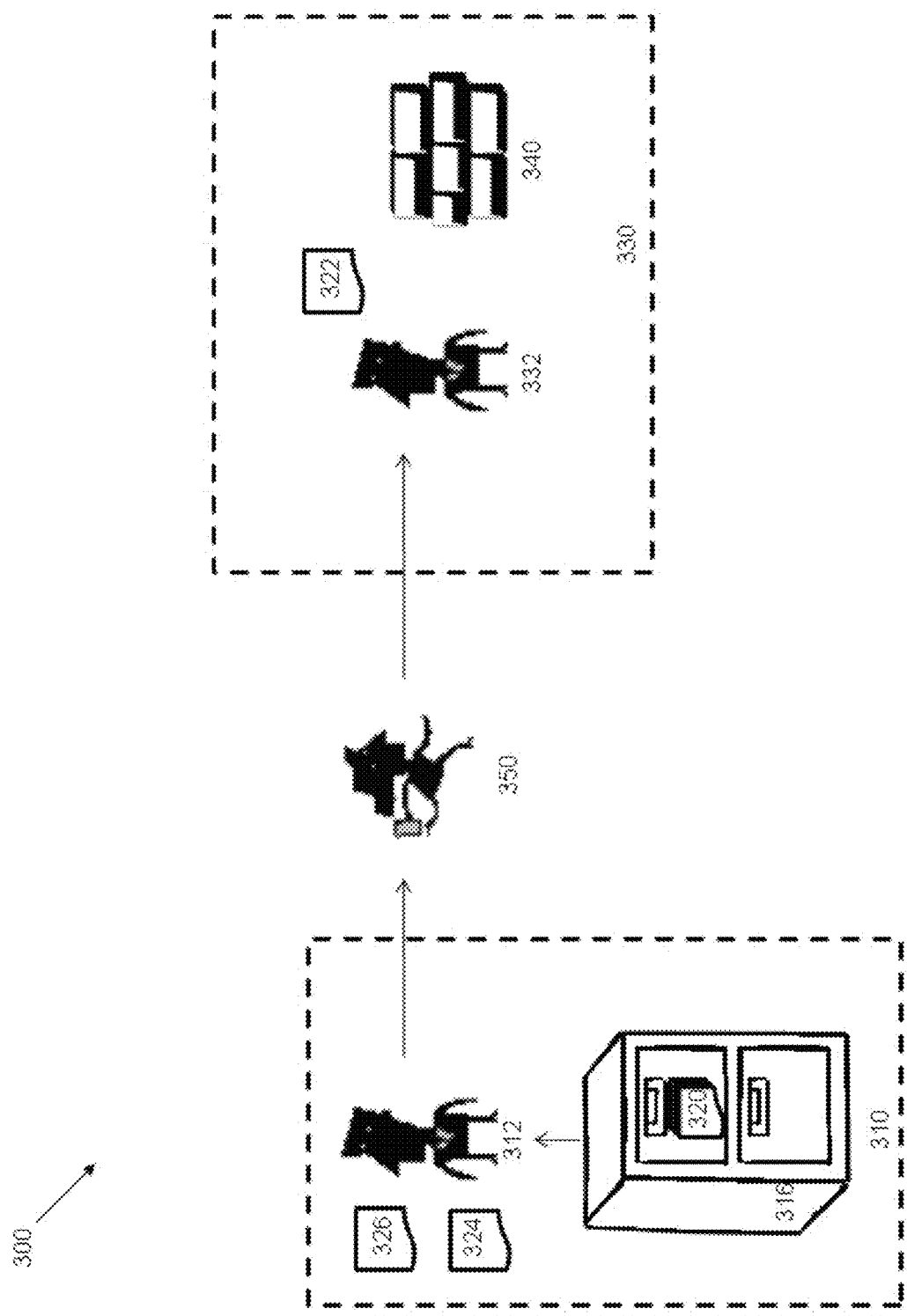
FIG. 3 is a schematic of a non-computerized system that ensures a secure 3D printing methodology.

FIG. 3 shows a non-electronic embodiment 300 of the current invention, having an instruction source 310 and a print facility 330. Instruction source 310 comprises a memory 316 and an instruction file 320 shown as a filing cabinet containing many files, each one of which containing a set of instructions for building a 3D object. Instruction agent 312 then takes the instruction file 320 and splits it up into three sets of instructions: 322, 324, and 326. Preferably, each set of instructions is printed upon non-scannable paper that cannot be scanned or photographed using normal means, such as colored paper which can only be read using reading glasses that differentiate between the background ink and the printed ink on the paper. Courier 350 then brings a set of instructions to print facility 330, shown here as a builder 332 following a first set of instructions 322 to build 3D object 340. Builder 332 could be monitored via a camera or a security entity to ensure that builder followed the first set of instructions 322 without copying those instructions, and then shreds or otherwise destroys those instructions before courier 350 provides the second set of instructions to builder 332. In this manner, builder 332 never has a hard copy of all of the instructions for printing the 3D object.

Figure 4:
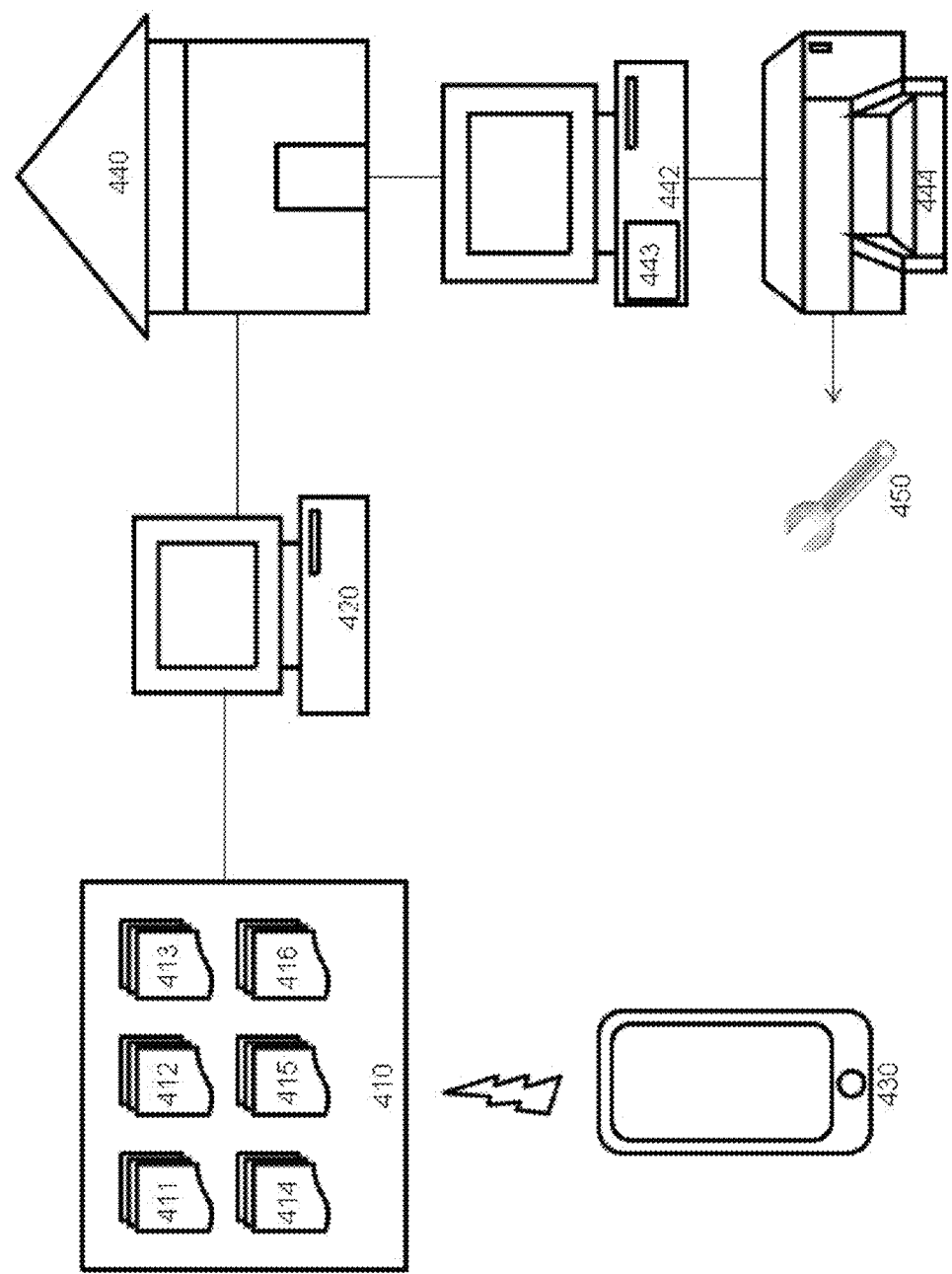
FIG. 4 is another schematic of an exemplary system embodying the current invention.

FIG. 4 shows an exemplary embodiment of an inventive system in use in commerce. In such an embodiment, a user utilizing portable computer system 430 could communicate with a transaction server 410 having a plurality of instruction sets 411, 412, 413, 414, 415, and 416. The user then selects a 3D object to print, and purchases the rights relating to one of the 3D print file instruction sets (e.g. the right to print a 3D object on his/her home computer or through a 3D printing facility). Transaction server 410 then sends the rights metadata to DRM server 420. Such metadata could include, for example, information identifying the user, the price paid for the transaction, the entities that now have access to the file containing instructions to print, and the number of times such an item could be printed. The DRM server could then generate a 3D print file key containing the rights metadata, and could then update the user's digital locker on the transaction server.

Thereafter, when a user initiates a print job for the purchased 3D object from any user device, transaction server 410 could send an encrypted 3D print file private key to DRM server 420 for retrieval. Here, the user initiates a print file job for DRM server 420 to print the file at the user's home 440, which has a computer 442 with an agent 443 which communicates with DRM server 420, and a printer 444. Agent 443 installed on computer 442 then securely prints the 3D object without ever having the full print file instruction set within memory, and the 3D object 460 is then delivered to the customer who purchased the file.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of printing a 3D object, comprising:
   receiving a first subset of instructions for printing the 3D object;
   printing a first part the 3D object in accordance with the first subset of instructions;
   receiving a second subset of instructions;
   deleting the first subset of instructions; and
   printing a second part of the 3D object in accordance with the second subset of instructions, wherein the step of deleting the first subset of instructions occurs prior to the step of printing the 3D object in accordance with the second subset of instructions.

2. The method of claim 1, wherein the step of receiving the first subset of instructions includes receiving a first encrypted subset of instructions.

3. The method of claim 2, wherein the first encrypted subset of instructions is encrypted on a first computer system prior to receipt.

4. The method of claim 3, wherein the first encrypted subset of instructions is decrypted on a second computer system after receipt.

5. The method of claim 3, wherein the first encrypted subset of instructions is decrypted using a 3D printer.

6. The method of claim 2, wherein the step of receiving the second subset of instructions comprises receiving a second encrypted subset of instructions.

7. The method of claim 6, further comprising decrypting the first encrypted subset of instructions; and decrypting the second encrypted subset of instructions, wherein the step of decrypting the first encrypted subset of instructions occurs before the step of decrypting the second encrypted subset of instructions.

8. The method of claim 7, wherein the step of deleting the first encrypted subset of instructions occurs prior to the step of decrypting the second encrypted subset of instructions.

9. The method of claim 2, wherein the first encrypted subset of instructions is received as a first encrypted packet and as a second encrypted packet.

10. The method of claim 9, wherein the first encrypted packet is decrypted prior to decrypting the second encrypted packet.

11. The method of claim 10, wherein the decrypted first packet is deleted prior to the step of decrypting the second encrypted packet.

12. The method of claim 2, wherein a private key is used to decrypt the first encrypted subset of instructions.

13. The method of claim 1, wherein the step of receiving the first subset of instructions comprises receiving the first subset of instructions with a secure print file player application.

14. The method of claim 13, wherein the secure print file player application resides on a computer system.

15. The method of claim 14, wherein the secure print file player application resides on a 3D printer.

16. The method of claim 1, further comprising deleting the second subset of instructions after the step of printing the 3D object in accordance with the second subset of instructions.

17. The method of claim 1, wherein the step of deleting the first subset of instructions occurs prior to the step of receiving the second subset of instructions.

* * * * *